US008861189B2

(12) United States Patent
Chen

(10) Patent No.: US 8,861,189 B2
(45) Date of Patent: Oct. 14, 2014

(54) ELECTRONIC DEVICE

(71) Applicant: Zhou Chen, Shenzhen (CN)

(72) Inventor: Zhou Chen, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 156 days.

(21) Appl. No.: 13/631,885

(22) Filed: Sep. 29, 2012

(65) Prior Publication Data
US 2013/0163170 A1    Jun. 27, 2013

(30) Foreign Application Priority Data

Dec. 27, 2011   (CN) .......................... 2011 1 0443312

(51) Int. Cl.
*G06F 1/16*    (2006.01)
*H04N 5/225*    (2006.01)

(52) U.S. Cl.
USPC ............ 361/679.23; 361/679.21; 361/679.22; 348/207.1; 348/373; 348/374; 348/375

(58) Field of Classification Search
CPC ..... G06F 1/607; G06F 1/1684; G06F 1/1686; G06F 1/1605; G06F 1/1607; H04N 5/2251; H04N 5/2257; H04M 1/0264
USPC ............... 361/679.01–679.3, 679.55–679.59; 345/156, 157, 168, 169; 248/917–924
See application file for complete search history.

(56) References Cited

U.S. PATENT DOCUMENTS

| | | | |
|---|---|---|---|
| 8,203,646 B2 * | 6/2012 | Fan | 348/373 |
| 2006/0061962 A1 * | 3/2006 | Oakley | 361/686 |
| 2006/0128429 A1 * | 6/2006 | Cha | 455/556.1 |
| 2007/0253703 A1 * | 11/2007 | Tsai et al. | 396/429 |
| 2008/0123314 A1 * | 5/2008 | Cheng et al. | 361/809 |
| 2009/0231484 A1 * | 9/2009 | Lee et al. | 348/373 |
| 2010/0053409 A1 * | 3/2010 | Chang | 348/333.01 |

* cited by examiner

*Primary Examiner* — Nidhi Desai
(74) *Attorney, Agent, or Firm* — Novak Druce Connolly Bove + Quigg LLP

(57) ABSTRACT

An electronic device comprises a main body, an operating mechanism secured to the main body; and a camera mechanism. The main body defines an opening. The camera mechanism is capable of being received in the opening. The operating mechanism is operable to drive the camera mechanism protruding out of the opening, and allows the camera mechanism to be retracted into and received in the opening.

16 Claims, 11 Drawing Sheets

ELECTRONIC DEVICE

BACKGROUND

1. Technical Field

The present disclosure relates to electronic devices.

2. Description of Related Art

Electronic device, such as computer, is capable of using an external camera to capture an image. However, the external camera is generally separated from the electronic device and tethered to the electronic device with a cable. The external camera takes up additional space when being used.

Therefore, there is room for improvement in the art.

BRIEF DESCRIPTION OF THE FIGURE

The components of the drawings are not necessarily drawn to scale, the emphasis instead being placed upon clearly illustrating the principles of the embodiment of an electronic device. Moreover, in the drawings, like reference numerals designate corresponding parts throughout several views.

DETAILED DESCRIPTION

Embodiments of the present disclosure will be described with reference to the drawings.

Figure 1:
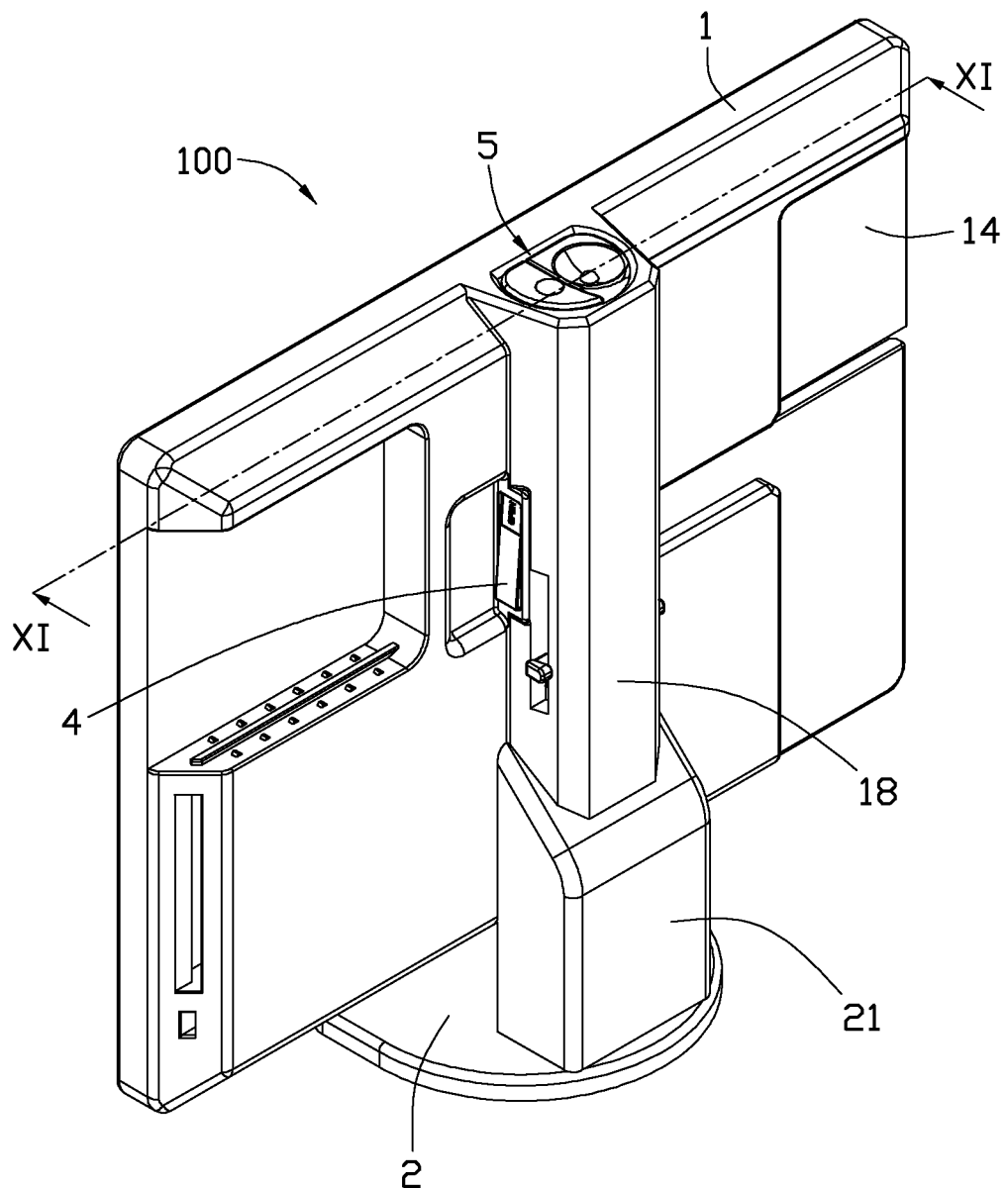
FIG. 1 is a schematic view of the electronic device according to an embodiment; the electronic device includes a camera mechanism.

Referring to FIG. 1, an electronic device 100 of one embodiment of the present disclosure is shown. The electronic device 100 includes a main body 1, a base 2 for supporting the main body 1, an operating mechanism 4, and a camera mechanism 5. The camera mechanism 5 is received in the main body 1 and is capable of protruding out of the main body 1 via the operating mechanism 4. In the embodiment, the electronic device 100 is a desktop computer.

Figure 2:
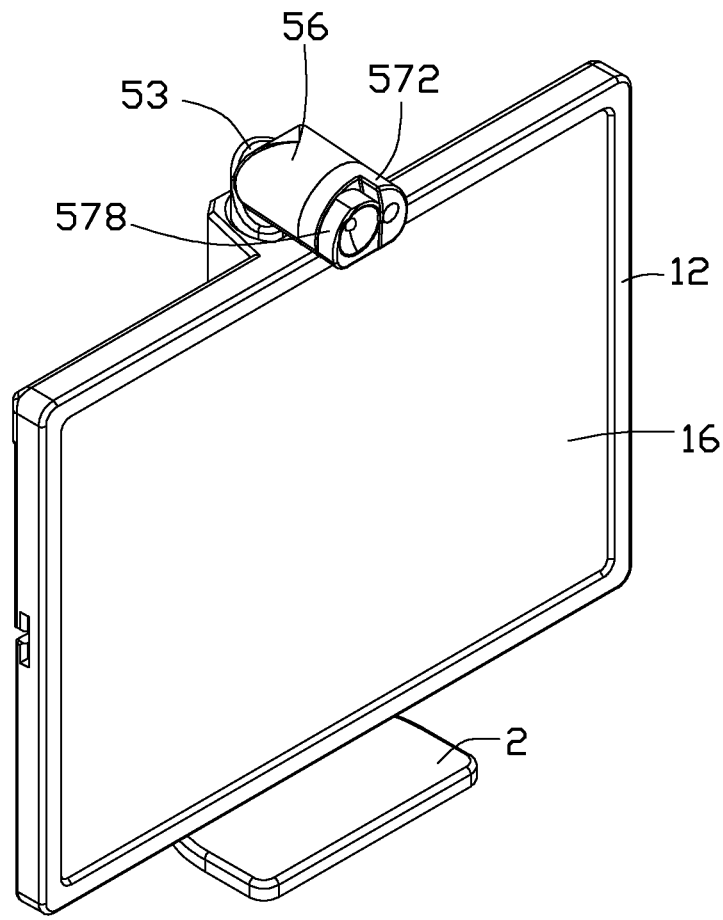
FIG. 2 is a schematic view of an electronic device of FIG. 1 being used, in another aspect.

Referring also to FIG. 2, the main body 1 of the embodiment is substantially rectangle. The main body 1 includes a first surface 12, a second surface 14 (shown in FIG. 3) opposite to the first surface 12, a display 16 and a receiving cavity 18 (shown in FIG. 3). The display 16 is disposed on the first surface 12. The receiving cavity 18 is perpendicularly disposed on the middle of the second surface 14 in a lengthwise direction.

Figure 3:
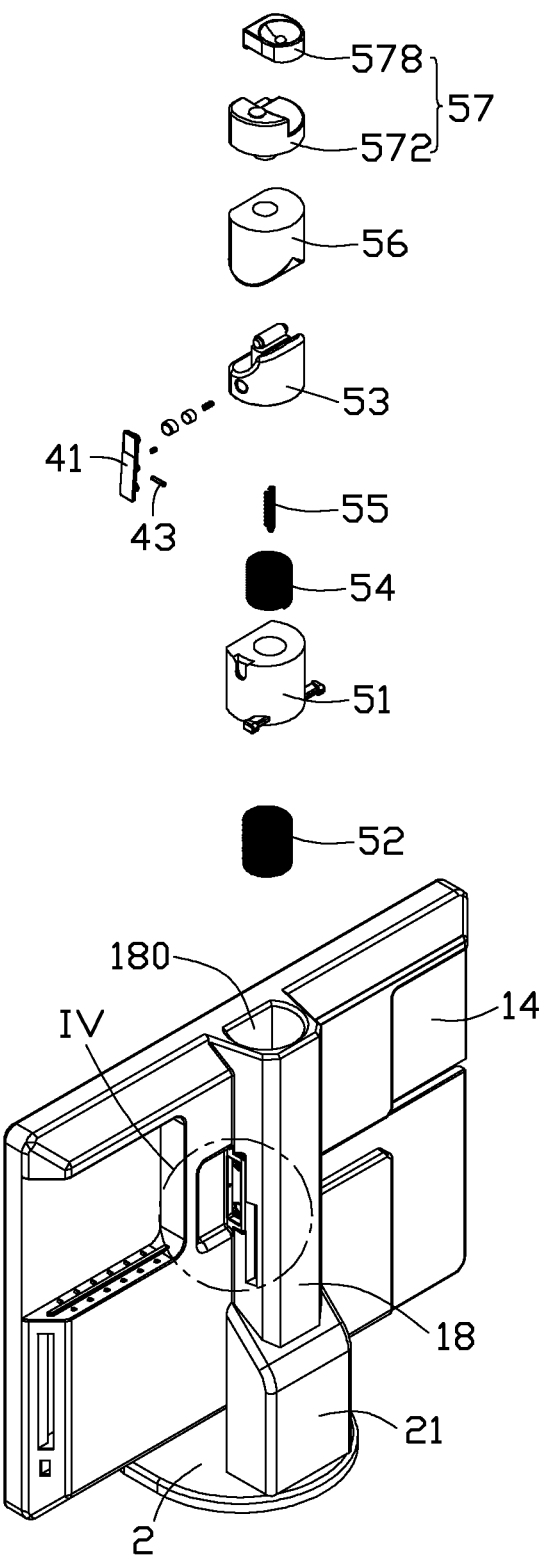
FIG. 3 is a partly disassembled view of the electronic device of FIG. 1.
Figure 4:
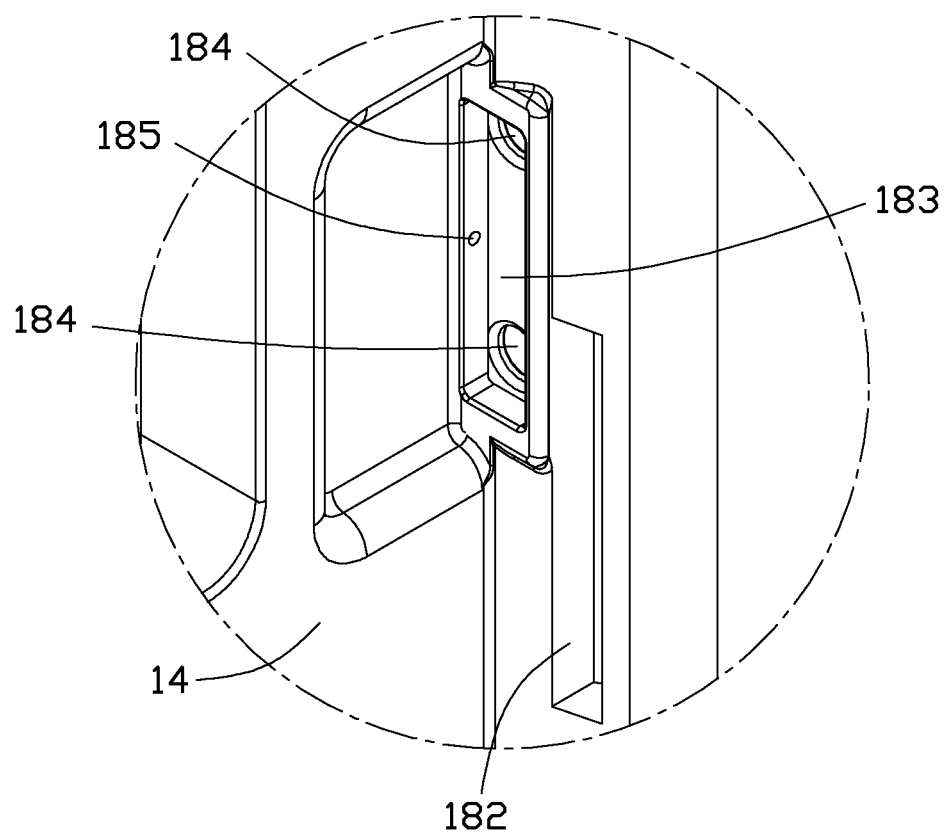
FIG. 4 is an enlarged view of section IV of the electronic device of FIG. 3.

Referring also to FIGS. 3 and 4, the receiving cavity 18 is substantially hollow cylindrical, and is secured to the base 2. The receiving cavity 18 defines an opening 180. The cross section of the opening 180 is substantially D-shaped. The opening 180 is used for receiving the camera mechanism 5. Opposite ends of the receiving cavity 18 defines two sliding slots 182 parallel with each other and communicating with the opening 180. Each sliding slot 182 extends in a direction parallel to the second surface 14, spaced from the second surface 14. The sliding slot 182 is substantially an elongated rectangle and is used for limiting the movement of the camera mechanism 5 in a longitudinal axis direction of the receiving cavity 18. The receiving cavity 18 further defines a first receiving portion 183 parallel with the sliding slot 182. The first receiving portion 183 is substantially elongated, and is set between the second surface 14 and the sliding slot 182. When viewed in a direction perpendicular to the second surface 14, the first receiving portion 183 is partly overlapped with the sliding slot 182. The bottom of the first receiving portion 183 defines two through holes 184 for communicating between the first receiving portion 183 and the opening 180. Two symmetrical fixing holes 185 are defined in opposite sidewalls of the first receiving portion 183 parallel with the second surface 14.

The base 2 is substantially a flat plate. A connecting member 21 is perpendicular to the base 2. The connecting member 21 is secured to the main body 1 and used for supporting the main body 1. A protruding post 213 perpendicularly extends from the end of the connecting member 21 away from the base 2 and is inserted into the receiving cavity 18. The receiving cavity 18 is partly received in the connecting member 21 and the protruding post 213 is received in the opening 180.

Figure 7:
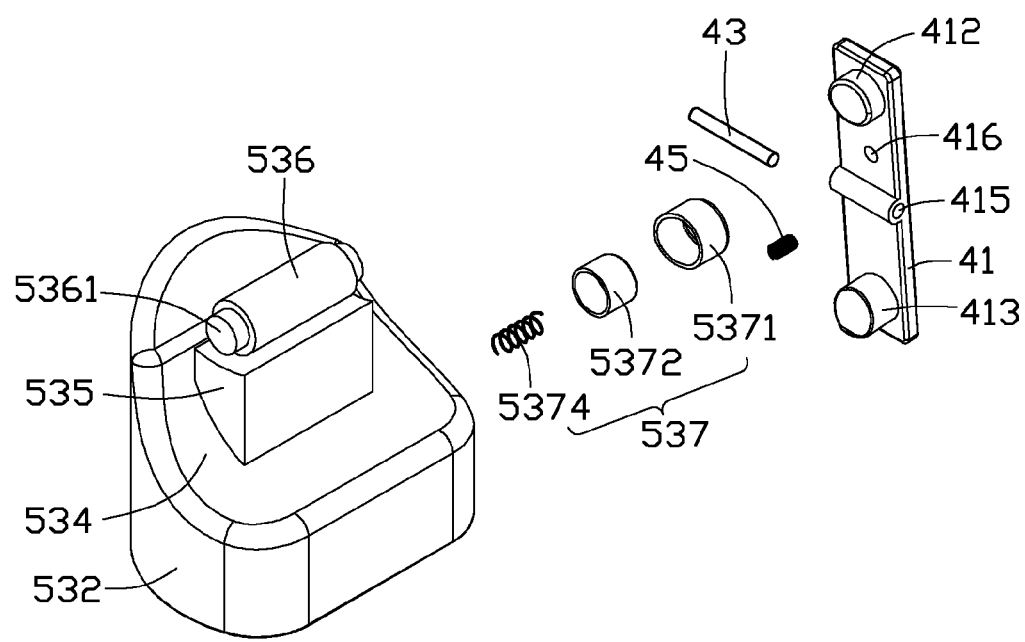
FIG. 7 is an enlarged view of the locking member and the operating member of FIG. 5, but viewed from another aspect.

Referring to FIG. 7, the operating mechanism 4 is rotatably secured to the first receiving portion 183. The operating mechanism 4 includes an operating plate 41, a first pivot 43, and a first spring 45. The operating plate 41 is substantially rectangle. The operating plate 41 includes a first pushing portion 412 and a second pushing portion 413. The first pushing portion 412 and the second pushing portion 413 are respectively set on opposite ends of the operating plate 41 corresponding to the through holes 184. The first pushing portion 412 and the second pushing portion 413 are substantially cylindrical. The distal end of the second pushing portion 413 away from the operating plate 41 is angle cut (not labeled). The height of the first pushing portion 412 relative to the operating plate 41 is lower than that of the second pushing portion 413. The operating plate 41 further defines a first pivot hole 415 and a blind hole 416. The pivot hole 415 is set between the first pushing portion 412 and the second pushing portion 413. The blind hole 416 is set between the first pushing portion 412 and the first pivot hole 415. The first pivot 43 is rotatably received in the first pivot hole 415. An opposite end of the first pivot 43 is received in the fixing hole 185. An end of the first spring 45 is received in the blind hole 416 and resists against the bottom of the first receiving portion 183. In the embodiment, the first spring is a coil spring.

Figure 5:
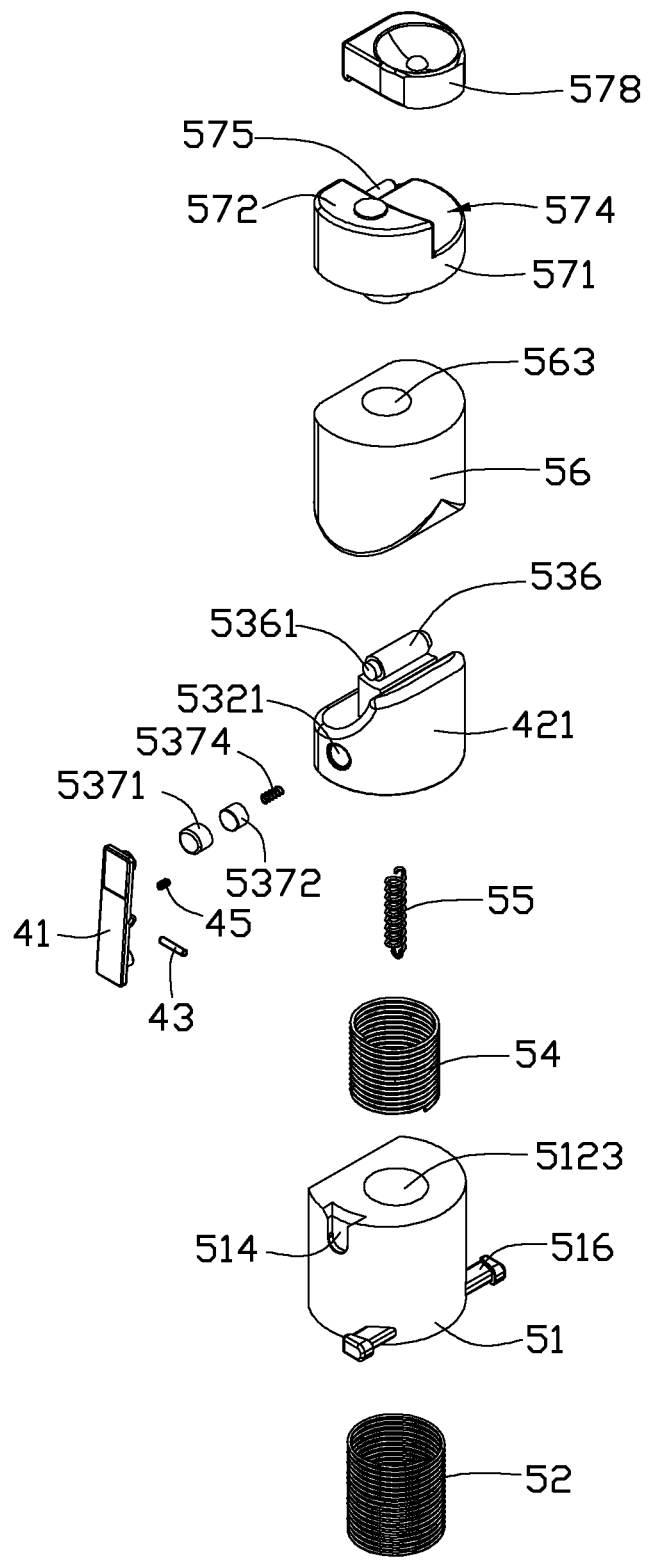
FIG. 5 is an enlarged view of the camera mechanism of FIG. 3, the camera mechanism includes a limiting member, a first elastic portion, a locking member, a second elastic portion, a third elastic portion, a rotating member, and a camera member.

Referring to FIGS. 3 and 5, the camera mechanism 5 of the embodiment is shown. The camera mechanism 5 includes a limiting member 51, a first elastic portion 52, a locking member 53, a second elastic portion 54, a third elastic portion 55, a rotating member 56, and a camera member 57.

Figure 6:
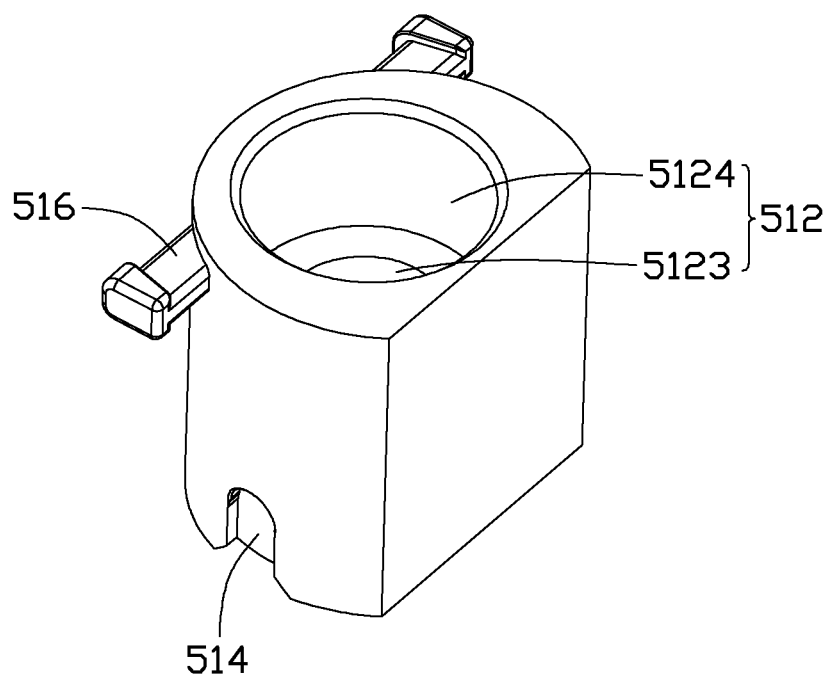
FIG. 6 is an enlarged view of the limiting member of FIG. 5, but viewed from another aspect.
Figure 11:
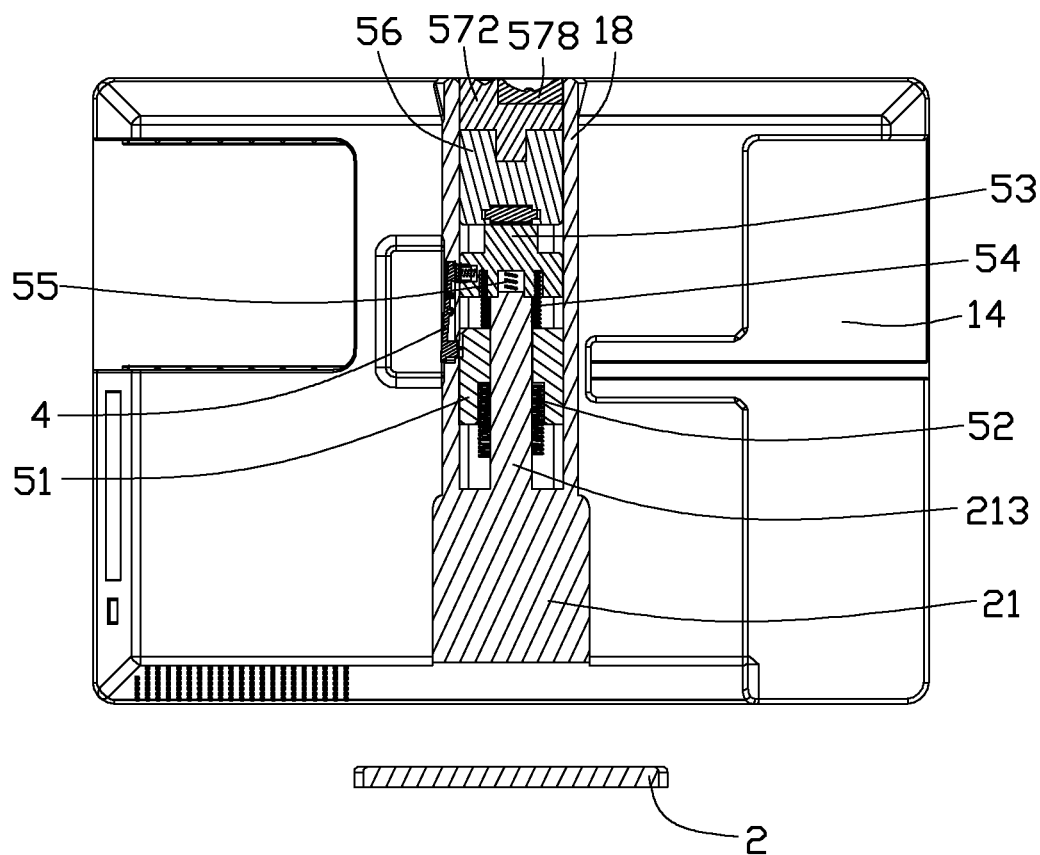
FIG. 11 is a cross section view of the electronic device of FIG. 1, taken along a line XI-XI thereof.

Referring also to FIGS. 6 and 11, the limiting member 51 is substantially cylindrical, and sleeves on the protruding post 213. The cross section of the limiting member 51 is substantially D-shaped. The limiting member 51 is capable of sliding in the opening 180 and being blocked by the second pushing portion 413. The limiting member 51 defines a stepped hole 512 and a first gap 514. The stepped hole 512 goes through the limiting member 51 in a longitudinal axis direction, and includes a first hole 5123 and a second hole 5124. The first hole 5123 and the second hole 5124 are substantially cylindrical, and communicate with each other. The diameter of the first hole 5123 is less than that of the second hole 5124, and is equal to the diameter of the protruding post 213. The first gap 514 is set on the sidewall of the limiting member 51 in a longitudinal axis direction, and corresponds to the through hole 184 away from the base 2. The first gap 514 is substantially U-shaped. Two symmetrical guiding portions 516 are perpendicularly set on the sidewall of the limiting member 51 in a direction perpendicular to the axis of the limiting member 51, and respectively correspond to the sliding slots 182. The end of each guiding portions 516 away from the limiting member 51 is inserted into and blocked by the sliding slot 182.

Referring to FIGS. 5 and 11, the first elastic portion 52 is arranged between the limiting member 51 and the connecting member 21 and is sleeved on the protruding post 213. An end of the first elastic portion 52 away from the connecting member 21 is received in the second hole 5124. The diameter of the first elastic portion 52 is equal to the diameter of the second hole 5124. In the embodiment, the first elastic portion 52 is a coil spring.

Figure 8:
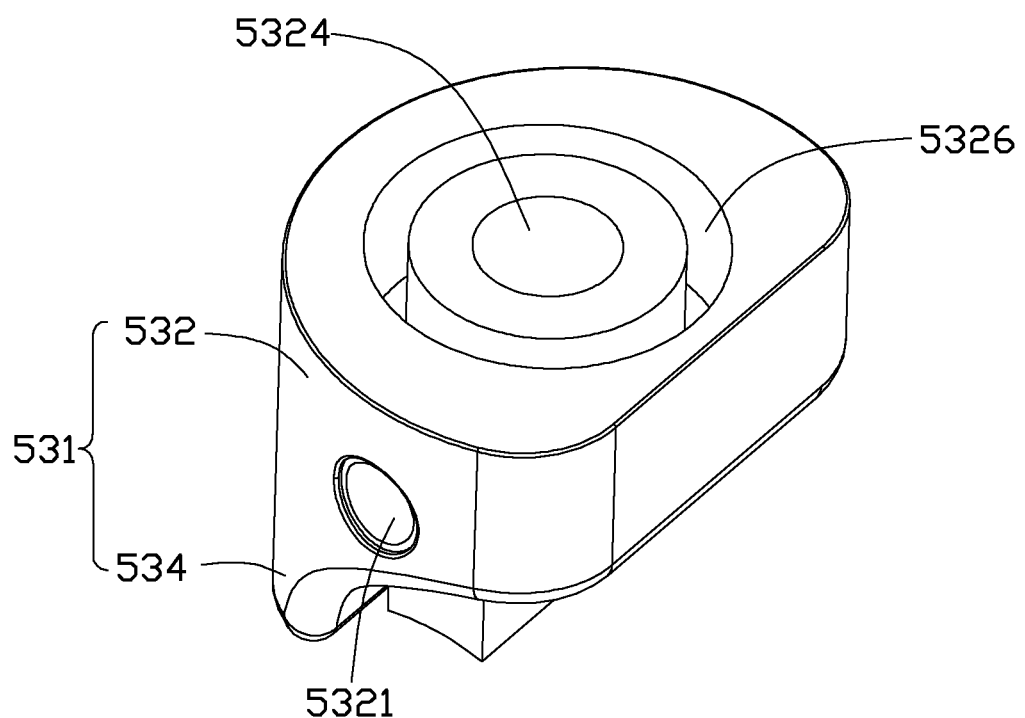
FIG. 8 is an enlarged view of the locking member of FIG. 7, but viewed from another aspect.

Referring also to FIGS. 7, 8, and 11 again, the locking member 53 is slidably received in opening 180 and sleeves on the protruding post 213. The locking member 53 includes a first body 531, a connecting portion 535, and a pressing portion 537. The first body 531 includes a first end 532 and a second end 534. The first end 532 is substantially cylindrical and is adjacent to the limiting member 51. The cross section of the first end 532 is horizontal and substantially D-shaped. The second end 534 is away from the limiting member 51 and defines a steep inclined plane (not labeled). The first body 531 further defines a receiving groove 5321, a second pivot hole 5324, and a second receiving portion 5326. The receiving groove 5321 is set on a sidewall of the first body 531 and corresponds to the first pushing portion 412. The second pivot hole 5324 and the second receiving portion 5326 are recessed from the first end 532. The diameter of the second pivot hole 5324 is equal to the protruding post 213. The second receiving portion 5326 is substantially annular and coaxial with the second pivot hole 5324.

The connecting portion 535 is secured to the second end 534. A positioning post 536 is disposed on the end of the connecting portion 535 away from the second end 534. The positioning post 536 is substantially cylindrical. The axis of the positioning post 536 is parallel with the first end 532. Two second pivots 5361 are symmetrically set on opposite ends of the positioning post 536. The second pivots 5361 are coaxial with the positioning post 536.

The pressing portion 537 is received in the first receiving groove 5321 and corresponds to the through hole 184 away from the base 2. The pressing portion 537 includes a button 5371, a limiting portion 5372, and a second spring 5374. The button 5371 is substantially cap-shaped. The height of the button 5371 is larger than the depth of the receiving groove 5321. The limiting portion 5372 is substantially a hollow cylindrical and is nested with the button 5371 for limiting the moving distance of the button 5371 in the receiving groove 5321. The limiting portion 5372 is coaxial with the button 5371. The height of the limiting portion 5372 is less than that of the button 5371, and the diameter of the limiting portion 5372 is less than that of the button 5371. The second spring 5374 is received in the limiting portion 5372. Opposite ends of the second spring 5374 are respectively connected with the bottom surfaces of the receiving groove 5321 and the button 5371.

Referring to FIGS. 5 and 11, the second elastic portion 54 sleeves on the protruding post 213. An end of the second elastic portion 54 is received in the second receiving portion 5326, and the other end of the second elastic portion 54 abuts the limiting member 51. The diameter of the second elastic portion 54 is equal to the diameter of the second receiving portion 5326. In the embodiment, the second elastic portion 54 is a coil spring.

The third elastic portion 55 is partly received in the second pivot hole 5324. Opposite ends of the third elastic portion 55 respectively fix on the bottom of the second pivot hole 5324 and the protruding post 213. The diameter of the third elastic portion is less than the diameter of the second pivot hole 5324. The length of the third elastic portion 55 is less than that of the second elastic portion 54. In the embodiment, the third elastic portion 55 is a coil spring.

Figure 9:
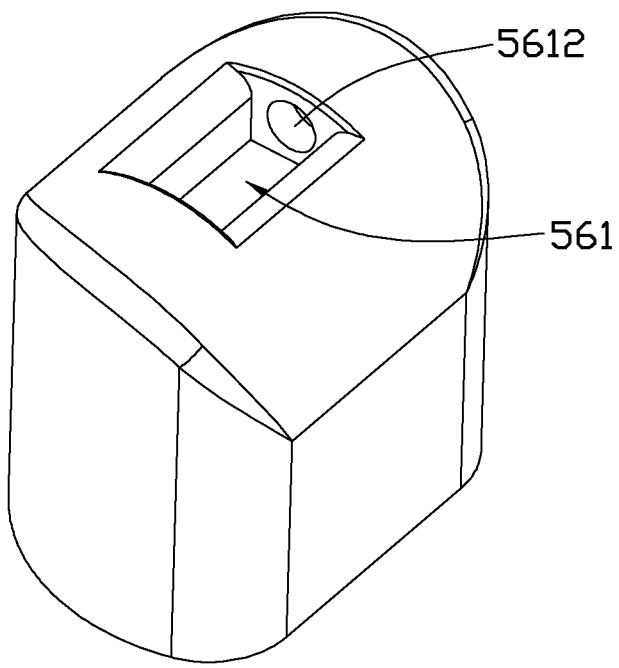
FIG. 9 an enlarged view of the rotating member of FIG. 5, but viewed from another aspect.

Referring to FIGS. 5 and 9, the rotating member 56 is rotatably connected with the locking member 53. The rotating member 56 is substantially cylindrical and the cross section of the rotating member 56 is substantially D-shaped. An end of the rotating member 56 adjacent to the locking member 53 defines a curved surface (not labeled). The curved surface further recesses to define a third receiving portion 561. Opposite sidewalls of the third receiving portion 561 define two third pivot holes 5612. The third pivot holes 5612 respectively correspond to and receive the second pivots 5361. An end of the rotating member 56 away from the third receiving portion 561 further defines a third pivot hole 563. In the embodiment, the rotating direction of the rotating member 56 is perpendicular to the axis of the protruding post 213 and along the steep inclined plane of the second end 534.

Figure 10:
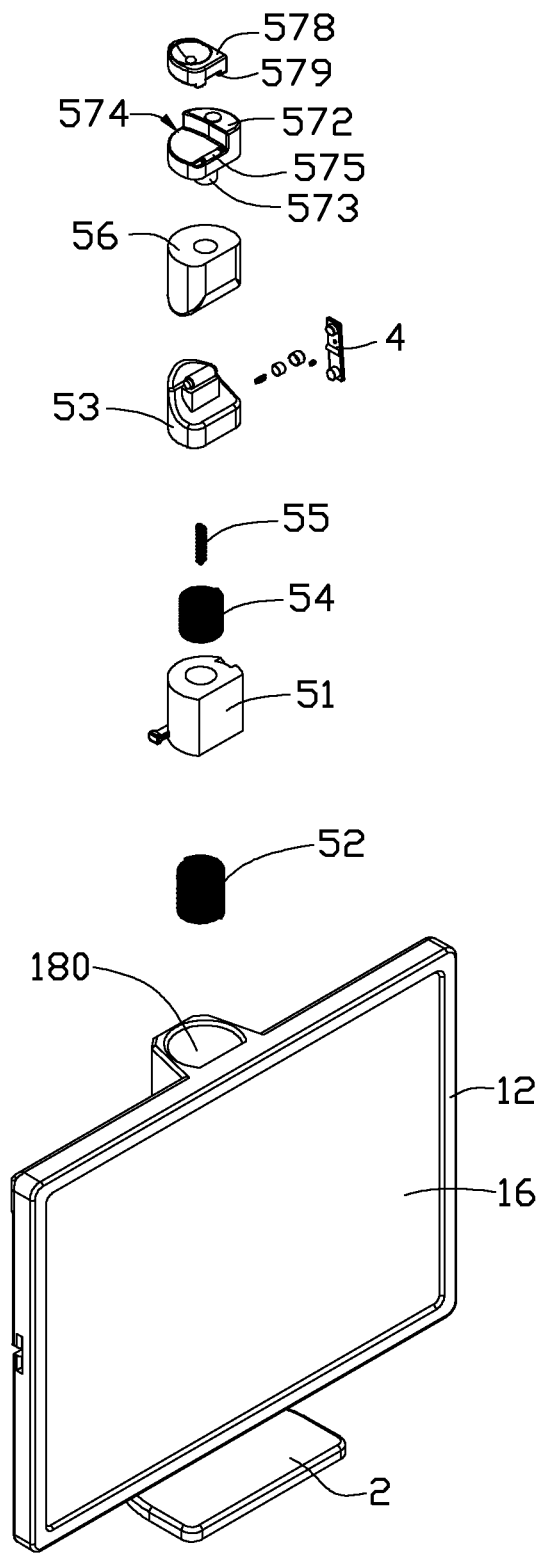
FIG. 10 shows another view of FIG. 3 items, but from another aspect.

Referring to FIGS. 2 and 10, the camera member 57 includes a second body 571 and a camera portion 578 rotatably secured to the second body 571. The second body 571 is substantially cylindrical. The cross section of the second body 571 is substantially D-shaped. The second body 571 is rotatably secured to the rotating member 56 and includes a lighting portion 572, a third pivot 573, and a fourth pivot 575. The lighting portion 572 perpendicularly extends from an end of the second body 571 away from the rotating member 56. The third pivot 573 is perpendicularly set on the end of the second body 571 away from the lighting portion 572. The third pivot 573 is coaxial with the second body 571. The sidewall of the lighting portion 572 and the surface of the second body 571 away from the rotating member 56 cooperatively define a second gap 574. The second gap 574 is substantially sector shaped. The fourth pivot 575 is received in the second gap 574 and disposed on the straight edge of the second body 571. In the embodiment, the lighting portion 572 includes a LED or a bulb, and the rotating surface of the second body 571 is perpendicular to the axis of the rotating member 56.

The camera portion 578 is received in the second gap 574 and is rotatably coupled to the fourth pivot 575. The camera portion 578 defines two symmetrically fourth pivot holes 579. The fourth pivot holes 579 perpendicular protrude from camera portion 578 and are used for receiving opposite ends of the fourth pivot 575. In the embodiment, the rotating surface of the camera portion 578 is perpendicular to the rotating surface of the second body 571.

Referring to FIGS. 1 and 11, in assembly, the first elastic portion 52, the limiting member 51, and the second elastic portion 54 are received in opening 180 and sleeved on the protruding post 213 in order. The third elastic portion 55 and the end of the protruding post 213 away from the connecting member 21 are received in the second pivot hole 5324. The rotating member 56 is rotatably coupled to second pivot 5361. The third pivot 573 is rotatably inserted into the third pivot hole 563. The camera portion 578 is rotatably received in the second gap 574 and is rotatably coupled to the fourth pivot 575. The pressing portion 537 is secured to the locking member 53 with the button 5371 being inserted into the corresponding through hole 184 and the second spring 5374 being in a normal state. The operating mechanism 4 is rotatably secured to the receiving cavity 18 by the first pivot 43, with the first pushing portion 412 abutting the button 5371 and the second pushing portion 413 being inserted into the corresponding through hole 184 and received in the first gap 514. The first spring 45 is in a normal state.

Referring to FIG. 2, to use the camera mechanism 5: the operating plate 41 is operated to drive the first pushing portion 412 to abut the button 5371 to deform the first spring 45. At this time, the second pushing portion 413 disengages with the first gap 514, and the limiting member 51 moves away from the connecting member 21 by the elastic force of the first elastic portion 52 in an longitudinal axis direction, until the guiding portion 516 is blocked with the sliding slot 182. At the same time, the locking member 53, the rotating member 56 and the camera member 57 are moved away from the connecting member 21 by the pushing force of the limiting member 51 and the elastic force of the second elastic portion 54. When the elastic force of the second elastic portion 54 and the third elastic portion 55 are equal, the connecting portion 535, the rotating member 56 and the camera member 57 are exposed out of the opening 180. If the rotating member 56 is rotated perpendicular to the locking member 53, the camera member 57 is parallel with the main body 1 facing the user. The angle of the camera portion 578 is adjustable by rotating the camera portion 578 and the lighting member 572.

When the camera mechanism 5 is not being used: the camera member 57 is rotated to be coaxial with the locking member 53 and is pressed towards the connecting member 21. If the camera 57 member is pushed, the locking member 53 moves towards the connecting member 21. The elasticity of the third elastic portion 55 is reduced, and the elasticity of the second elastic portion 54 is increased. When the button 5371 is inserted into the through hole 184 away from the connecting member 21, the locking member 53 is stopped. Meanwhile, the limiting member 51 is moved towards the connecting member 21 along the sliding slots 182, and the first elastic portion 52 is pressed. When the second pushing portion 413 is received in the first gap 514, the limiting member 51 is stopped. Thus, the camera mechanism 5 is retracted into and received in the opening 180.

While various exemplary and preferred embodiments have been described, the disclosure is not limited thereto. On the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. An electronic device, comprising: a main body defining an opening; an operating mechanism secured to the main body; and a camera mechanism capable of being received in the opening; wherein the operating mechanism is operable to drive the camera mechanism protruding out of the opening, and allows the camera mechanism to be retracted into and received in the opening; wherein the camera mechanism is capable of sliding in a first direction and partly rotating in a second direction perpendicular to the first direction; the first direction is parallel with the main body; wherein the operating mechanism comprises a first pushing portion; the camera mechanism comprises a locking member slidably received in the opening; the locking member comprises a pressing portion; the pressing portion is operable to disengage with the main body via the first pushing portion being inserted into the opening to abut the pressing portion; wherein the camera mechanism comprises a first elastic portion; the first elastic portion under the locking member is partly received in the locking member; the first elastic portion is used for providing a first elasticity to the locking member for sliding out of the opening; and wherein the camera mechanism further comprises a second elastic portion partly received in the locking member; the second elastic portion sleeved in the first elastic portion is cooperated with the first elastic portion for limiting the sliding distance of the camera mechanism in the opening; the elasticity direction of the second elastic portion is opposite to that of the first elasticity.

2. The electronic device of claim 1, wherein the camera mechanism further comprises a rotating member rotatably secured to the locking member and a camera member rotatably secured to the rotating member; the rotating member is capable of sliding in the opening; when the rotating member is exposed from of the opening the rotating member further can rotate in a surface parallel with the longitudinal axis of the opening to adjust the angle between the main body and the camera member.

3. The electronic device of claim 2, wherein the locking member comprises a connecting portion secured to the distal end of the locking member; the distal end of the locking member is an angle cut; the connecting portion comprises two pivots; the pivots are perpendicular disposed on opposite end of the connecting portion for rotatably connecting the rotating member.

4. The electronic device of claim 2, wherein the camera member comprises a body, a lighting portion, and a camera portion; the body is rotatably secured to the rotating member; the lighting portion perpendicularly extends from a base of the body away from the rotating member; the body and the lighting portion forms a first gap; the camera portion is rotatably received in the first gap.

5. The electronic device of claim 4, wherein the rotating surface of the body is perpendicular to the rotating surface of the camera portion.

6. The electronic device of claim 1, wherein the electronic device further comprises a base for supporting the electronic device; the base comprises a protruding post; the protruding post is inserted into the opening and received in the locking member; opposite ends of the second elastic portion are connected with the locking member and the protruding post.

7. The electronic device of claim 6, wherein the locking member defines a first hole and a first receiving portion; the first hole is used for receiving the end of the protruding post and the second elastic portion; the first receiving portion is used for receiving the first elastic portion.

8. The electronic device of claim 7, wherein the diameter of the first hole is smaller than the diameter of the first receiving portion.

9. The electronic device of claim 1, wherein the operating mechanism further comprises a second pushing portion under the first pushing portion; the camera mechanism further comprises a limiting member under the locking member; the second pushing portion is inserted into the opening to block the limiting member; the limiting member is operable to slide in the opening for providing elasticity when the second pushing portion is disengaged from the limiting member.

10. The electronic device of claim 9, wherein the limiting member defines a second gap for receiving the second pushing portion; the second gap is substantially U-shaped.

11. The electronic device of claim 9, wherein the camera mechanism further comprises a third elastic portion; the third elastic portion is partly received in the limiting member and is used for providing a third elasticity to the locking member when the second pushing portion is disengaged with the limiting member.

12. The electronic device of claim 9, wherein the main body further defines at least one sliding slot; the limiting member further comprises at least one guiding portion; the at least one guiding portion perpendicularly extends from the limiting member; an end of the at least one guiding portion away from the limiting member inserted into the at least one sliding slot is blocked with the at least one sliding slot; the at least one guiding portion is capable of sliding in the at least one sliding slot to limit the sliding distance of the limiting member in the opening.

13. The electronic device of claim 12, wherein the at least one sliding slot is parallel to the longitudinal axis of the opening; the at least one sliding slot is parallel to the main body and spaced from the main body.

14. The electronic device of claim 12, wherein the main body defines a second receiving portion; the second receiving portion for receiving the operating mechanism is parallel and partly overlapped with the at least one sliding slot.

15. The electronic device of claim 14, wherein the operating mechanism further comprises an operating plate; the first pushing portion and the second pushing portion are perpendicularly extend from opposite ends of the operating plate.

16. The electronic device of claim 15, wherein the operating mechanism further comprises a spring received in the second receiving portion, the operating plate further defines a blind hole between the first pushing portion and the second pushing portion; one end of the spring is received in the blind hole and the other end of the spring abuts the bottom surface of the second receiving portion.

\* \* \* \* \*